United States Patent [19]

Haynes et al.

[11] 4,330,632

[45] May 18, 1982

[54] LIGHTWEIGHT CONCRETE USING POLYMER FILLED AGGREGATE FOR OCEAN APPLICATIONS

[75] Inventors: Harvey H. Haynes, Camarillo; Robert D. Rail, Ojai, both of Calif.

[73] Assignee: The United States of America as represented by the Secretary of the Navy, Washington, D.C.

[21] Appl. No.: 219,689

[22] Filed: Dec. 24, 1980

[51] Int. Cl.$^3$ .................... C04B 7/02; C04B 33/04
[52] U.S. Cl. .................... 501/140; 106/90; 106/97; 106/308 M; 428/407
[58] Field of Search .................... 106/70, 90, 97, 98, 106/288 B, 308 M; 428/407

[56] References Cited

U.S. PATENT DOCUMENTS

| | | | |
|---|---|---|---|
| 2,776,914 | 1/1957 | Faulwetter | 106/97 |
| 3,042,535 | 7/1962 | Hiltrop et al. | 106/97 |
| 3,650,784 | 3/1972 | Albert et al. | 106/90 |
| 3,784,357 | 1/1974 | Muraoka | 106/98 |
| 3,900,332 | 8/1975 | Davis | 106/97 |
| 4,134,775 | 1/1979 | Schwoegler | 106/70 |
| 4,234,659 | 11/1980 | Kostandov et al. | 428/407 |
| 4,241,138 | 12/1980 | Chentemirov et al. | 428/407 |
| 4,256,499 | 3/1981 | Terrel | 106/70 |

*Primary Examiner*—James Poer
*Attorney, Agent, or Firm*—Robert F. Beers; Joseph M. St. Amand

[57] ABSTRACT

A structural grade lightweight concrete that is especially suited for ocean applications. The lightweight concrete uses regular lightweight aggregate particles that have been modified by filling the voids within the particles with a polymeric material. The polymer-filled aggregate particles are then bonded together using a cementitious or binder material to form concrete. Typically Portland cement is used as the binder to produce a lightweight concrete for construction of ocean structures.

14 Claims, 2 Drawing Figures

LIGHTWEIGHT CONCRETE USING POLYMER FILLED AGGREGATE FOR OCEAN APPLICATIONS

BACKGROUND OF THE INVENTION

This invention is related to concrete and more particularly to structural grade lightweight concrete especially suited for construction of ocean structures.

Normal weight concrete has found considerable application in energy-related offshore structures, such as oil drilling and production platforms. Proposals abound for other applications, such as submerged oil production enclosures, seafloor fuel storage tanks, and even liquefied natural gas transport ships. In any one of these applications, a construction material lower in unit weight than normal weight concrete would be beneficial to the designer in planning a structure of less draft or higher payload capacity.

Structural lightweight aggregate concrete, using naturally occurring or manufactured lightweight aggregate, is a commonly used construction material. Typically lightweight aggregate particles have a void volume of 30 to 60 percent whereas natural "hard rock" aggregates have a void volume of about five percent or less. The greater volume of entrapped air in lightweight aggregate is the reason for the reduced weight compared to normal weight (hard rock) concrete.

Regular lightweight concrete materials present a problem when applied to ocean applications, such as buoyancy tanks, because seawater permeates through the Portland cement binder and eventually fills the voids within the aggregate particles. Hence the unit weight of the concrete changes with time. This is undesirable because the actual buoyancy of the structure at any given time is not known with certainty. Regular lightweight aggregate concrete can increase in weight by as much as 25 percent from seawater absorption.

Another problem with regular lightweight concrete is that the maximum compressive strength is limited by the strength of the aggregate particles. In some locations of the country, lightweight concrete has a maximum compressive strength of 6000 psi whereas in other locations only 5000 psi. The maximum strength depends on the properties of the lightweight aggregate available at the different locations.

Prior art patents frequently have used polymeric particles, polystyrene-bead materials, or other lightweight cellular materials in place of at least some of the aggregate in concrete to reduce the density. However, none of the prior art lightweight concretes have satisfactory compressive strength for use with ocean structures due to the limited strength of the aggregate particles used.

This invention provides a means to minimize seawater absorption by the aggregate; and also provides a means to produce concretes having increased compressive strength compared to regular lightweight concretes of equal unit weight.

SUMMARY OF THE INVENTION

This invention relates to a lightweight Portland cement concrete that uses a specially prepared aggregate to provide a weight savings of 40 percent as compared to normal weight concrete and a compressive strength greater than that of regular lightweight concrete. The specially prepared aggregate is prepared from regular lightweight aggregate by having the void volume of the aggregate particles filled with a polymeric material. The lightweight aggregate particles that have been modified by filling the voids with polymeric material are then bonded together using a cementitious or binder material to form concrete.

DESCRIPTION OF THE PREFERRED EMBODIMENTS

Figure 1:
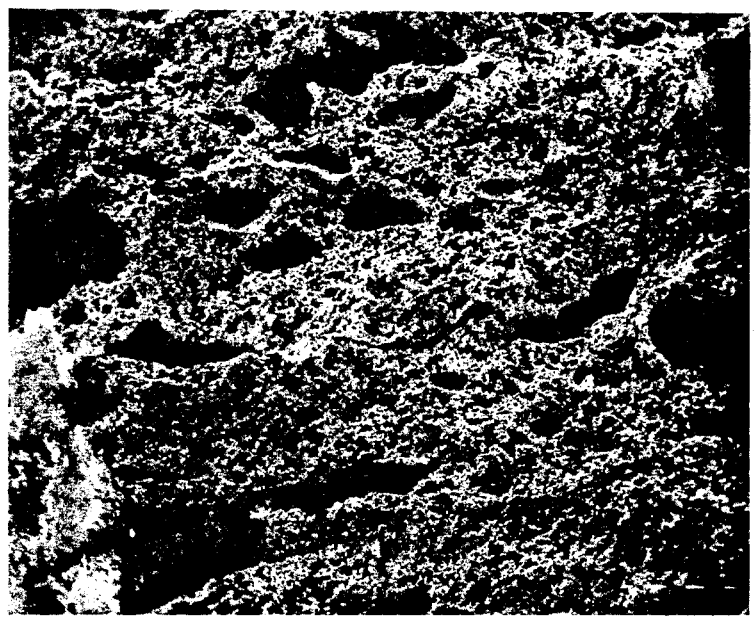
FIG. 1 shows a scanning electron microscope illustration of a typical regular lightweight aggregate particle at 15 times magnification.

Regular lightweight aggregate for structural grade concretes is typically a manufactured product made by using heat to expand naturally occurring shales, clays, and slates and industrial by-products such as slag and fly ash. In all cases, the aggregates are light in weight because of an internal cellular structure of the individual aggregate particles, such as shown in FIG. 1.

The only difference between lightweight concrete and normal weight concrete is that some or all of the "hard rock" sand, gravel, or crushed rock is replaced by lightweight aggregate. Typically, the unit weight of normal weight concrete is 150 pounds per cubic foot (pcf) while structural lightweight concrete ranges from 90 to 120 pcf.

Figure 2:
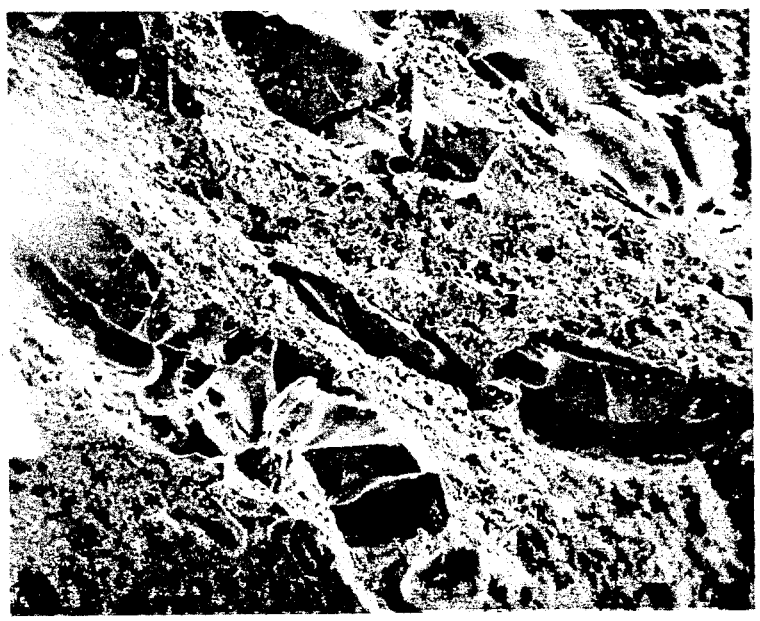
FIG. 2 illustrates a polymer-filled lightweight aggregate particle also at 15 times magnification.

To improve the compressive strength of lightweight concrete, a specially prepared aggregate is used. Regular lightweight aggregate is impregnated with polymeric materials to produce a polymer-filled aggregate. The internal cellular structure of the individual aggregate particles are filled with polymeric materials, resulting in an aggregate having an internal structure as shown in FIG. 2.

There are several reasons for filling just the aggregate and not the entire concrete material:

The specific gravity of polymer is approximately equal to that of seawater. Hence, aggregate filled with polymer will have approximately the same weight as seawater-saturated regular lightweight aggregate. This means that the in-water unit weight of concrete saturated from deep ocean exposure will be substantially the same if polymer-filled aggregate (PFA) or regular lightweight aggregate is used.

The compressive strength of PFA concrete is greater than that of the regular lightweight concrete because the individual aggregate particles are stronger. Lightweight concrete strength is usually controlled by the strength of the aggregate particles. Regular lightweight aggregate particles have 30 to 60 percent void volume, which is the cause of a relatively weak particle strength. PFA particles have their void volume filled with polymer which imparts added strength to the particles and results in higher compressive strengths for lightweight concretes.

The elastic moduli for PFA and regular lightweight concrete will be similar. This is beneficial for applications which require a relatively low elastic modulus and a nonlinear material response near ultimate conditions.

Polymer impregnation techniques are available for filling all the voids in concrete (i.e., both the cement voids and the aggregate voids), but this method causes the elastic modulus to increase to about twice that of nonimpregnated concrete and the material exhibits brittle behavior at or near ultimate load conditions. These are undesirable characteristics in some cases.

Expanded shale lightweight aggregate, such as manufactured under the brand name of Rocklite (Ventura, Calif.), is typical of lightweight aggregate that can be used in making the PFA used in this invention. The internal structure of a non-impregnated lightweight aggregate particle is illustrated in FIG. 1 showing the numerous voids.

In preparing polymer-filled aggregate, regular lightweight aggregate, such as shown in FIG. 1, was impregnated with polymeric materials using a procedure, for example, as follows:

The impregnation process used a monomer (liquid) to impregnate the voids in the aggregate and then used heat to polymerize the liquid into a solid. The monomer system was, by weight, 83 percent methyl methacrylate (MMA), 5 percent trimethylolpropane trimethacrylate (TMPTMA), and 12 percent polymethyl methacrylate (PMMA). The aggregate was oven-dried at 150° C. for 24 hours to remove free moisture from the press. The aggregate was then placed in a chamber and evacuated for 18 hours; at that point monomer was introduced into the chamber.

Impregnation occurred for three hours at 15 psig overpressure. Excess monomer was drained and hot water (85° to 95° C.) was introduced into the chamber to initiate polymerization of the monomer. After four hours the aggregate was removed to an oven for heating overnight at 110° C. to assure complete polymerization.

A second impregnation may be conducted to increase the polymer loading of the aggregate if necessary. Also, other procedures suitable for loading the aggregate with polymer can be used. FIG. 2 shows the voids of a typical lightweight aggregate particle after being filled with polymer material.

Monomer systems developed for impregnating other materials can also be used to fill the aggregate particles.

The polymer-filled aggregate particles are then mixed with a cementitious or binder material, using Portland cement for example, to form a lightweight concrete.

Table 1 gives some examples of mix designs for concrete using both regular lightweight aggregate and polymer-filled aggregate. The basis for the designs of Mix No. 1 through 3 was manufacturers' technical literature. Mix No. 4 was a modification of Mix No. 3 in which a greater proportion of large aggregate was used. The aggregate sizes were blended to meet ASTM specifications C-33 for grading of concrete aggregates.

TABLE 1

Cement: Portland Type III, High Early Strength
Water Reducer: Pozzolith 300 N at Rate of 3 oz/sack

| Mix No. | Cement/ Sand/ Coarse Aggregate (by weight) | Cement Content (lb/yd$^3$) | Water/Cement (by weight) Regular | Water/Cement (by weight) PFA | Slump (in.) Regular | Slump (in.) PFA |
|---|---|---|---|---|---|---|
| 1 | 1/2.22/1.41 | 460 | 0.33 | 0.58 | 1¼ | 1 |
| 2 | 1/1.55/1.12 | 590 | 0.32 | 0.49 | 2¼ | 2 |
| 3 | 1/1.77/0.94 | 710 | 0.31 | 0.44 | 2½ | 2 |
| 4 | 1/0.78/1.21 | 710 | 0.28 | 0.41 | 2½ | 4 |

The aggregate proportions in Table 1 are for regular lightweight particles in a dry or "as received" condition from the manufacturer. The manufacturer packages oven-dry material in paper sacks, but moisture may be picked up by the aggregate during storage. The aggregate weights used during batching were from slightly moisture-laden aggregates. Without having the oven-dry weights, the quantity of PFA to use in each batch could not be calculated using weighting methods. Therefore, a volume batching method was used.

Slump was used to control the quantity of water added to each batch of concrete. The significantly different water-to-cement ratios between PFA and regular lightweight concrete resulted from using the totally saturated condition of the regular aggregate and the nonsaturated condition of the PFA. The quantity of water added to the mixes was the amount used in calculating the water-to-cement ratio.

All specimens were fog-cured for 28 days prior to testing for strength or before placement in other environmental conditions for unit weight measurements.

Table 2 presents the results from compressive and splitting tensile tests for the lightweight concretes of Table 1.

TABLE 2

| Mix No. | Compressive Strength (psi) Regular | Compressive Strength (psi) PFA | Compressive Strength (psi) % Difference | Splitting Tensile Strength (psi) Regular | Splitting Tensile Strength (psi) PFA | Splitting Tensile Strength (psi) % Difference | Elastic Modulus ($\times 10^6$ psi) Regular | Elastic Modulus ($\times 10^6$ psi) PFA | Elastic Modulus ($\times 10^6$ psi) % Difference | Poisson's Ratio Regular | Poisson's Ratio PFA | Poisson's Ratio % Difference |
|---|---|---|---|---|---|---|---|---|---|---|---|---|
| 1 | 3,840 | 4,450 | +15.8 | 420 | 430 | +2.3 | 1.78 | 1.78 | 0 | 0.26 | 0.21 | −19.2 |
| 2 | 4,700 | 5,940 | +26.4 | 470 | 500 | +6.4 | 1.96 | 2.03 | +3.6 | 0.25 | 0.27 | +8.0 |
| 3 | 5,180 | 6,400 | +23.6 | 480 | 500 | +4.2 | 2.08 | 2.14 | +2.9 | 0.25 | 0.28 | +12.0 |
| 4 | 5,200 | 6,580 | +26.5 | 500 | 520 | +4.0 | 2.19 | 2.41 | +10.0 | 0.24 | 0.22 | −8.3 |

The compressive strength tests were conducted on 4 by 8-inch cylinders in accordance with ASTM C-39, and splitting tensile strength tests in accordance with ASTM C-496. The modulus of elasticity and Poisson's ratios were obtained using the standard procedure in ASTM C-469.

In compression, the concrete mixtures increased in strength as the cement contents increased from 460 to 710 lb/cu yd (Mix No. 1 through 3). The cement content was the same for Mix No. 3 and 4 at 710 lb/cu yd, and the compressive strengths are essentially equal.

For the regular lightweight concrete, the maximum compressive strength $f_c'$ averaged 5,200 psi. Failure was caused by rupture of the aggregate particles. For the PFA concrete, the maximum $f_c'$ was 6,530 psi—an increase of 26 percent over that of regular lightweight concrete; failure in this case was caused by failure of the bond between the aggregate and cement matrix. Thus, the strength of the PFA concrete could increase with continued fog-curing while the regular lightweight concrete had attained its maximum strength limit. It is important to state that the strength difference between regular lightweight and PFA concrete will increase with age beyond the present 26 percent.

For splitting tensile strengths, the PFA concrete showed an average increase of only four percent over that of regular lightweight concrete. A splitting tensile strength of 500 psi appeared to be the limit for the concretes.

The elastic modulus for the PFA concrete was also four percent greater than that of the regular lightweight concrete. The stress-strain behavior for the concretes was quite similar. For the higher strengths, both types of concrete showed little nonlinear behavior before failure. The specimens showed predominantly vertical cracking behavior at failure.

The stronger aggregate particles of the PFA concrete probably contributed to a greater ultimate strain, which was an average 3,300 $\mu$in./in., compared to 2,750 $\mu$in./in. for the regular lightweight concrete. The ultimate strain values were also quite consistent.

Poisson's ratio varied considerably from test to test, which is typical for concrete. However, the overall average for the PFA and the regular lightweight concrete was the same at 0.25.

The compressive strength of polymer-filled aggregate concrete is greater than that of regular lightweight concrete because the void volume of the aggregate is filled or nearly filled with a solid material and the strength of a material is directly related to its void volume or porosity.

The unit weight of polymer-filled aggregate will be essentially the same as that for seawater saturated regular lightweight aggregate because the specific gravity of polymer is approximately equal to that of seawater. Hence, the weight of a submerged structure made of polymer-filled aggregate concrete will not only weigh the same as a structure having seawater saturated regular lightweight concrete, but will also have a more constant weight because less seawater is absorbed by a newly built structure. A maximum increase in unit weight of five percent will occur in polymer-filled aggregate concrete from seawater absorption.

A weight savings of 40 percent is achieved for submerged structures that use polymer-filled aggregate concrete ($115-64=51$ lb/ft$^3$ in water unit weight) in place of normal weight concrete ($150-64=86$ lb/ft$^3$). Such a weight savings has a major impact on the life cycle cost of the structure. For a massive, moored floating structure, the size of the hull to support a fixed payload can be made smaller. A smaller hull uses considerably less material which reduces first cost. In addition, the smaller size hull results in lower drag forces which reduces the mooring forces. The mooring lines and anchors can be reduced in size for a major cost saving. Over the life of the structure, several mooring lines—and possible anchors—will be required so the cost savings accumulate.

Additional weight savings can be obtained for thick-walled structures by building a multi-layer wall. The exterior layer, exposed to the seawater, is polymer-filled aggregate concrete while the interior layer is regular lightweight concrete with the aggregate empty of water. The exterior layer will function as a waterproofing barrier and prevent the void volume of the interior concrete from becoming water filled.

Past tests have shown that the exterior layer would be effective in waterproofing the interior layer. Experiments have shown that a four-inch wall thickness of normal weight concrete exposed to deep ocean environmental conditions at 2000 to 5000 feet became watertight within one year. It appears that the voids in the cement paste become plugged by the formation of brucite and/or aragonite.

An outside layer of polymer-filled aggregate concrete will function similar to that of normal weight concrete and waterproof the remainder of the wall thickness which is regular lightweight concrete. The following example will illustrate the weight saving from the multi-layer wall approach.

If a concrete spherical structure of 40 feet outside diameter by two feet wall thickness were designed for a seafloor application, the structure would have a positive buoyancy of 780,000 pounds when made of normal weight concrete at 150 lb/ft$^3$, or 1,100,000 pounds when made of polymer-filled aggregate concrete at 115 lb/ft$^3$. The increase in buoyancy (indicating reduced dead weight) of the polymer-filled aggregate concrete sphere is 41 percent compared to the normal weight concrete sphere.

If the sphere were fabricated having polymer-filled aggregate concrete for the exterior 0.5 foot and regular lightweight concrete (unit weight of 100 lbs/ft$^3$) making up the remainder of the wall thickness, then the buoyancy would be 1,200,000 pounds. This multi-layer wall sphere of lightweight concrete construction has an increase in buoyancy of 54 percent compared to that of the normal weight concrete sphere.

Another advantage of the invention is that anti-fouling chemicals can be incorporated into the polymeric filler material to prevent the growth of marine organism on the exterior of ocean structures. U.S. Pat. No. 3,784,375 teaches filling lightweight aggregate with liquid anti-fouling chemicals; however, these chemicals eventually leach out of the concrete. The present invention permits chemicals such as organotin compounds to be linked to the polymer molecules used for filling the lightweight aggregate and therefore be an effective solid anti-fouling filler material. The leach rate is slow and the potential useful life for the anti-fouling properties is greater than that disclosed in the prior art. Preventing marine fouling has a significant economic affect on a structure because drag forces are substantially reduced which means the mooring forces are reduced.

Anti-fouling concrete is only required on the exterior surface of an ocean structure; therefore, the multi-layer wall approach may be applied effectively in this case. A one-inch thickness of anti-fouling concrete, which can be applied manually, pneumatically, or by other means, will protect the structure from marine fouling.

An alternate method to make polymer-filled aggregate concrete is to use polymer or sulphur as the binder. Both polymer and sulphur binders give further weight savings compared to Portland cement.

Obviously many modifications and variations of the present invention are possible in the light of the above teachings. It is therefore to be understood that within the scope of the appended claims the invention may be practiced otherwise than as specifically described.

What is claimed is:

1. A lightweight concrete for ocean structures and applications, comprising:
 a. a binder material;
 b. a specially prepared aggregate admixed with said binder material;
 c. said specially prepared aggregate comprising:

a lightweight aggregate the individual particles of which have a porous internal cellular structure providing a 30 to 60 percent void volume therein; said individual aggregate particles having the void volume of their porous internal cellular structure substantially filled with a solid material; said void volume of the lightweight aggregate porous internal cellular structure being filled under pressure with a polymer material which is cured to a solid hardened state to provide strength to the individual aggregate particles prior to admixing with the binder material; said aggregate filled with polymer material having approximately the same unit weight as seawater saturated regular lightweight aggregate; said polymer material filling only the void volume of the aggregate porous internal cellular structure and not voids in the lightweight concrete binder material;

d. said polymer material which fills the voids in said lightweight aggregate particles being formed from a liquid monomer comprising, by weight, 83 percent methyl methacrylate, 5 percent trimethylolpropane trimethacrylate, and 12 percent polymethyl methacrylate, impregnated into said voids, and polymerized by heat into a solid;

e. said specially prepared aggregate having greater strength and minimizing the absorption of seawater by the aggregate and imparting higher compressive strengths to the resultant lightweight concrete over regular lightweight concretes of equal unit weight while maintaining a desirable relatively low elastic modulus;

f. said lightweight concrete using polymer filled aggregate being operable in use to substantially function as a waterproof barrier.

2. A lightweight concrete as in claim 1 wherein said binder material comprises Portland cement.

3. A lightweight concrete as in claim 1 wherein said binder material comprises sulphur.

4. A lightweight concrete as in claim 1 wherein said lightweight aggregate particles cellular structure are formed from expanded shales.

5. A lightweight concrete as in claim 1 wherein said lightweight aggregate particles cellular structure are formed from expanded clays.

6. A lightweight concrete as in claim 1 wherein said lightweight aggregate particles cellular structure are formed from expanded slates.

7. A lightweight concrete as in claim 1 wherein said lightweight aggregate particles cellular structure are formed from fly ash.

8. A lightweight concrete as in claim 1 wherein said lightweight aggregate particles cellular structure are formed from slag.

9. A lightweight concrete as in claim 1 wherein anti-fouling chemicals are incorporated into the polymer material to provide an effective solid anti-fouling filler material having a slow leach rate and greater useful life for anti-fouling properties thereof.

10. A lightweight concrete as in claim 9 wherein said anti-fouling chemicals are organotin type anti-fouling compounds.

11. A lightweight aggregate for use in admixing with binder materials for producing lightweight concrete for ocean structures and applications, comprising:

a. regular lightweight aggregate materials the individual particles of which have a porous internal cellular structure which provides a void volume therein;

b. said individual aggregate particles each having the void volume of their porous internal cellular structure substantially filled with a solid material; said void volume being filled under pressure with a polymer material which is cured to a solid hardened state to form said solid material and provide greater strength to the individual aggregate particles; said polymer material operating to minimize the absorption of seawater to a maximum of 5 percent increase in unit weight; said aggregate filled with solid polymer material having approximately the same unit weight as seawater saturated regular lightweight aggregate;

c. said polymer material which fills the voids in said lightweight aggregate particles being formed from a liquid monomer comprising, by weight, 83 percent methyl methacrylate, 5 percent trimethylolpropane trimethacrylate, and 12 percent polymethyl methacrylate, impregnated into said voids and polymerized by heat into a solid.

12. A lightweight aggregate as in claim 11 wherein anti-fouling chemicals are incorporated into the polymer material to provide an effective solid anti-fouling filler material having a slow leach rate and greater useful life for anti-fouling properties thereof.

13. A lightweight concrete as in claim 1 wherein said polymer material filling the porous internal cellular structure of said lightweight aggregate has a specific gravity approximately equal to seawater.

14. A lightweight aggregate as in claim 11 wherein said polymer material filling the porous internal cellular structure of said lightweight aggregate has a specific gravity approximately equal to seawater.

* * * * *